(12) United States Patent
Wurzer et al.

(10) Patent No.: US 9,293,905 B1
(45) Date of Patent: Mar. 22, 2016

(54) WALK-ON CABLE TRAY APPARATUS FOR A PEOPLE MOVER SYSTEM

(71) Applicants: David T. Wurzer, Carroll, IA (US); Terry D. Wurzer, Panora, IA (US); Adam J. Wurzer, Carroll, IA (US)

(72) Inventors: David T. Wurzer, Carroll, IA (US); Terry D. Wurzer, Panora, IA (US); Adam J. Wurzer, Carroll, IA (US)

(73) Assignee: Terad Fabricating, Inc., Carroll, IA (US)

( * ) Notice: Subject to any disclaimer, the term of this patent is extended or adjusted under 35 U.S.C. 154(b) by 0 days.

(21) Appl. No.: 14/541,444

(22) Filed: Nov. 14, 2014

Related U.S. Application Data

(63) Continuation-in-part of application No. 12/807,934, filed on Sep. 17, 2010, now Pat. No. 8,979,037.

(51) Int. Cl.
*F16L 3/00* (2006.01)
*H02G 9/02* (2006.01)
*H02G 3/06* (2006.01)

(52) U.S. Cl.
CPC ............. *H02G 9/025* (2013.01); *H02G 3/0608* (2013.01)

(58) Field of Classification Search
CPC ........... H02G 9/00; H02G 9/02; H02G 9/025; H02G 9/04; H02G 3/0608
USPC ............................... 174/68.1; 362/153, 153.1
See application file for complete search history.

(56) References Cited

U.S. PATENT DOCUMENTS

| | | | | |
|---|---|---|---|---|
| 1,686,363 | A * | 10/1928 | Baldwin | E01F 9/065 362/153 |
| 2,166,516 | A * | 7/1939 | Bainbridge | A62C 33/06 104/275 |
| 3,471,629 | A | 10/1969 | O'Leary | |
| 4,969,400 | A | 11/1990 | Burg et al. | |
| 5,024,251 | A | 6/1991 | Chapman | |
| 5,683,170 | A * | 11/1997 | Blaha | E01C 17/00 362/145 |
| 6,116,748 | A * | 9/2000 | George | F21S 2/00 362/127 |
| 6,344,611 | B2 | 2/2002 | Ewer | |
| 6,609,684 | B2 | 8/2003 | Van Scoy et al. | |
| 7,017,615 | B2 | 3/2006 | Suzuki et al. | |
| 7,562,629 | B2 | 7/2009 | Lohr et al. | |
| 7,943,851 | B2 * | 5/2011 | Lubanski | F16L 57/00 138/155 |
| 2003/0155148 | A1 | 8/2003 | Lockard | |
| 2006/0109667 | A1 * | 5/2006 | Flaherty | E01F 9/0165 362/431 |
| 2008/0283291 | A1 | 11/2008 | Makwinski et al. | |
| 2012/0068024 | A1 * | 3/2012 | Wurzer | H02G 3/0608 248/49 |

* cited by examiner

*Primary Examiner* — Christopher Garft
(74) *Attorney, Agent, or Firm* — Dennis L. Thomte; Thomte Patent Law Office LLC

(57) ABSTRACT

A cable tray apparatus is provided for a people mover system such as a Sky Train or the like. The cable tray apparatus is made up of a plurality of identical cable trays which are secured together in an end-to-end relationship. The cable trays are selectively laterally horizontally adjustable with respect to one another and are selectively vertically adjustable with respect to one another to correspond to curves in the roadway of the system and to correspond to elevational changes in the roadway of the system. Each of the cable trays includes a cover having an upstanding tactile warning device at the side edges thereof. A light is also associated with each of the tactile warning devices.

4 Claims, 7 Drawing Sheets

WALK-ON CABLE TRAY APPARATUS FOR A PEOPLE MOVER SYSTEM

CROSS REFERENCE TO RELATED APPLICATION

This is a Continuation-In-Part of application Ser. No. 12/807,934 filed Sep. 17, 2010 entitled A CABLE TRAY APPARATUS FOR A PEOPLE MOVER SYSTEM.

BACKGROUND OF THE INVENTION

1. Field of the Invention

This invention relates to a walk-on cable tray apparatus for use with a people mover system such as a Sky Train™ or the like. Even more particularly, the cable trays which make up the cable tray apparatus of this invention are identical and are secured together in an end-to-end relationship at one side of the cars of a single-track people mover system or between the cars of a double-track system. Even more particularly, this invention relates to a cable tray having a hinged cover system and tactile warning devices which protrude upwardly from the outer sides of the cover system of the cable tray. This invention also relates to lights which are incorporated into the upwardly protruding tactile warning devices.

2. Description of the Related Art

In people mover systems such as a Sky Train system, a plurality of vehicles or cars travel along a guideway or roadway with the guideway or roadway being normally elevated. In many cases, a double track system is provided with the cars of one of the tracks being horizontally spaced from the cars of the other track. Power and control signals for the cars normally comprise cables positioned in trays which are positioned on the roadway on one side of the cars traveling on the roadway or between the cars of a double-track system. In some cases, the cable trays are used as walkways to enable persons in the cars of the system to walk away from the cars should the cars become disabled.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A cable tray apparatus is provided for use with an electric train such as a Sky Train which travels along a power rail positioned on a roadway with the train including one or more cars having opposite sides. In many cases, a double-track system is provided. A plurality of generally rectangular electrical cable trays make up the cable tray apparatus with the cable trays having first and second sides and first and second ends with the cable trays being identical to one another. The cable trays are connected together in an end-to-end relationship and are positioned on the roadway at one side of the cars of the train. In a double track system, the cable trays are positioned between the roadways. The cable trays are selectively laterally horizontally adjustable with respect to one another and are selectively vertically adjustable with respect to one another to correspond to curves in the roadway and to correspond to elevational changes in the roadway respectively.

Each of the cable trays include a body portion having a bottom wall with first and second ends and first and second upstanding side walls with upper ends. Each of the cable trays includes a cover, having a first end, a second end, a first side edge and a second side edge. The cover has an outer surface and an inner surface. The cover is selectively movable between a closed position and an open position. The cover, when in its closed position, extends between the upper ends of the first and second side walls of the body portion. The upper surface of the cover, which is usually comprised of a pair of cover members, has a non-slip surface.

A first elongated tactile warning device extends upwardly from the outer surface of the cover at the first side edge thereof. The first tactile warning device extends between the first and second ends of the cover. A second elongated tactile warning device extends upwardly from the outer surface of the cover at the second side edge thereof. The second tactile warning device extends between the first and second ends of the cover.

In the preferred embodiment, the cover is comprised of a pair of cover members which are hingedly secured to the first and second side walls of the body portion.

In one embodiment of the invention, the first and second tactile warning devices have an inverted V-shaped cross-section. In another embodiment of the invention, the first and second tactile warning devices comprise an upstanding plate.

In the preferred embodiment, at least one light is associated with the first tactile warning device for illuminating the cover. In the preferred embodiment, at least one light is associated with the second tactile warning device for illuminating the cover. In the preferred embodiment, a deflector structure is associated with the lights to prevent the rays of the light from passing upwardly.

It is therefore a principal object of the invention to provide an improved walk-on cable tray apparatus for a people mover system.

A further object of the invention is to provide a walk-on cable tray apparatus for a people mover system wherein the outer surface of the cover of the cable tray has a non-slip surface provided thereon.

A further object of the invention is to provide a walk-on cable tray apparatus for a people mover system wherein the opposite side edges of the cover thereof have tactile warning devices extending upwardly therefrom along the length of the cable tray.

A further object of the invention is to provide a walk-on cable tray apparatus for a people mover system which includes tactile warning devices on the sides thereof and which have lights associated therewith.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
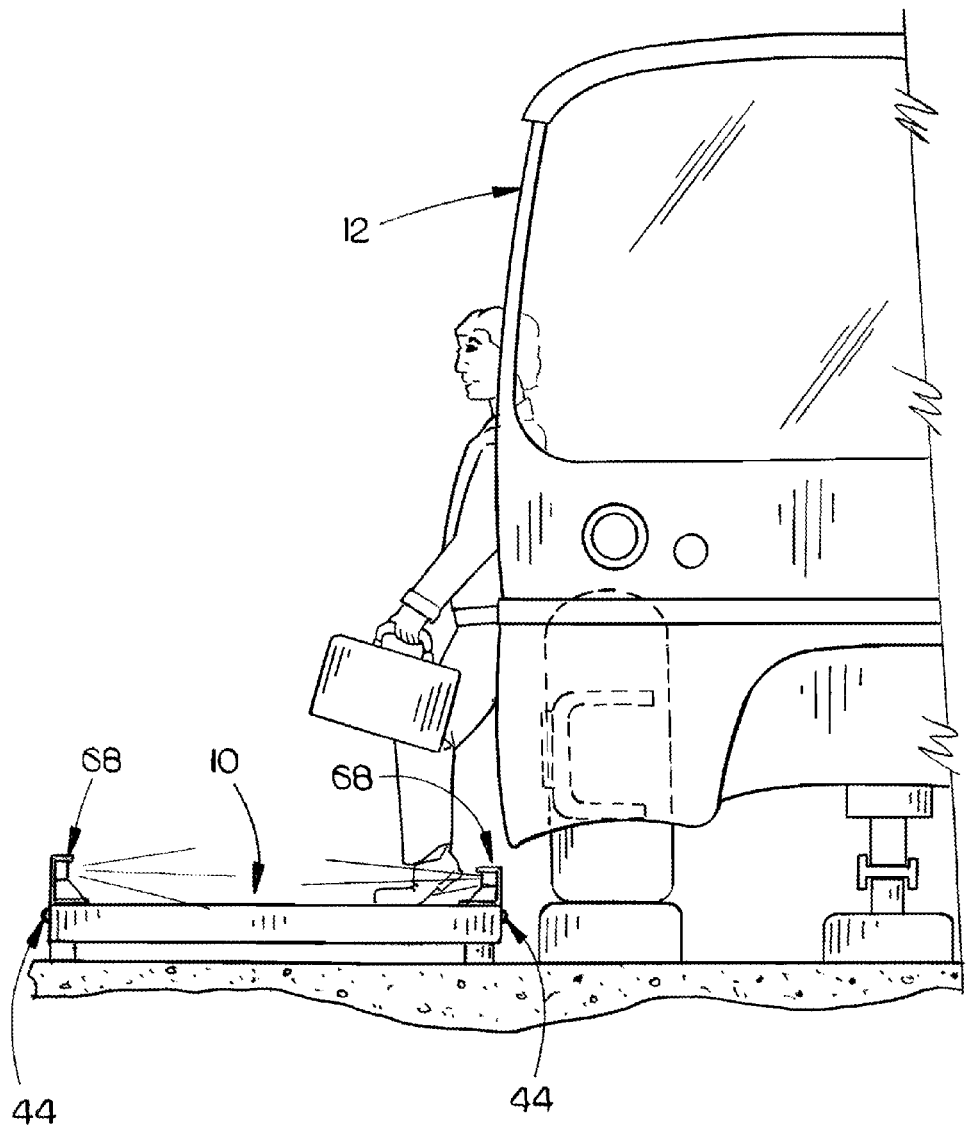
FIG. 1 is an end view illustrating the walk-on cable tray of this invention positioned at one side of a people mover system.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The walk-on cable tray of this invention is designated by the reference numeral 10. A plurality of the cable trays 10 are secured to one another in an end-to-end relationship such as disclosed in co-pending application Ser. No. 12/807,934 filed Sep. 17, 2010 entitled A CABLE TRAY APPARATUS FOR A PEOPLE MOVER SYSTEM; Ser. No. 12/807,934 filed Sep. 17, 2010 entitled A CABLE TRAY APPARATUS FOR A PEOPLE MOVER SYSTEM; and Ser. No. 12/927,347 filed Nov. 12, 2010 entitled EXPANSION JOINT FOR A CABLE TRAY APPARATUS FOR A PEOPLE MOVER SYSTEM, now U.S. Pat. No. 8,534,613 issued Sep. 17, 2013, the disclosures of which are incorporated herein by reference thereto to complete the disclosure of this invention if necessary.

Figure 2:
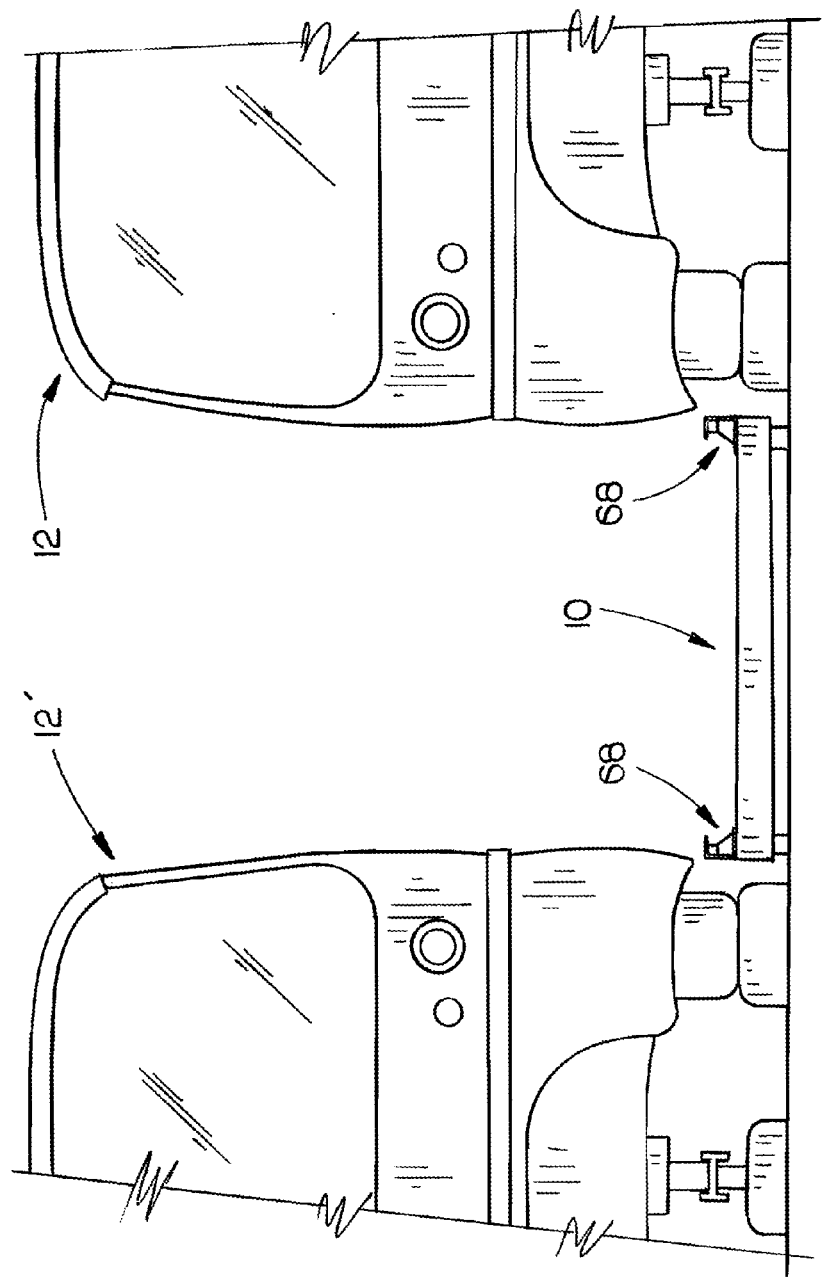
FIG. 2 is a view illustrating the walk-on cable tray of this invention positioned between the cars of a double track people mover system.

The cable trays 10 include the expansion joints of U.S. Pat. No. 8,534,613 to enable the trays 10 to be selectively vertically connected together and to be selectively horizontally connected together to compensate for curves and elevational changes in the track system and to compensate for the expansion and contraction of the cable trays 10. The reference numeral 12 refers to one of the cars of a single track system (FIG. 1) while the reference numerals 12 and 12' refer to the cars of a double track system (FIG. 2). In the single track system of FIG. 1, the cable trays 10 are positioned at one side of the car 12. In the double track system of FIG. 2, the trays are positioned between the cars 12 and 12'.

Each of the cable trays 10 include a body portion 14 having a bottom wall 16, upstanding side walls 18 and 20, and ends 22 and 24. The trays 10 also include partitions 21 such as disclosed in the co-pending applications and an expansion joint between the cable trays to compensate for temperature changes as disclosed in U.S. Pat. No. 8,534,613. As stated, the trays 10 are connected together in an end-to-end manner, as disclosed in the co-pending applications, to enable the trays 10 to compensate for curves and elevation changes in the roadway.

A first cover 26 is hingedly secured to the upper end of side 18 of tray 10 and is movable between open and closed positions. A second cover 28 is hingedly secured to the upper end of side 20 of tray 10 and is movable between open and closed positions. When the covers 26 and 28 are in the closed position, they close the upper end of body portion 14. Although two covers are preferred, a single cover could be used if so desired. The upper surface of covers 26 and 28 has anti-slip surfaces 30 and 32 thereon respectively.

Figure 6:
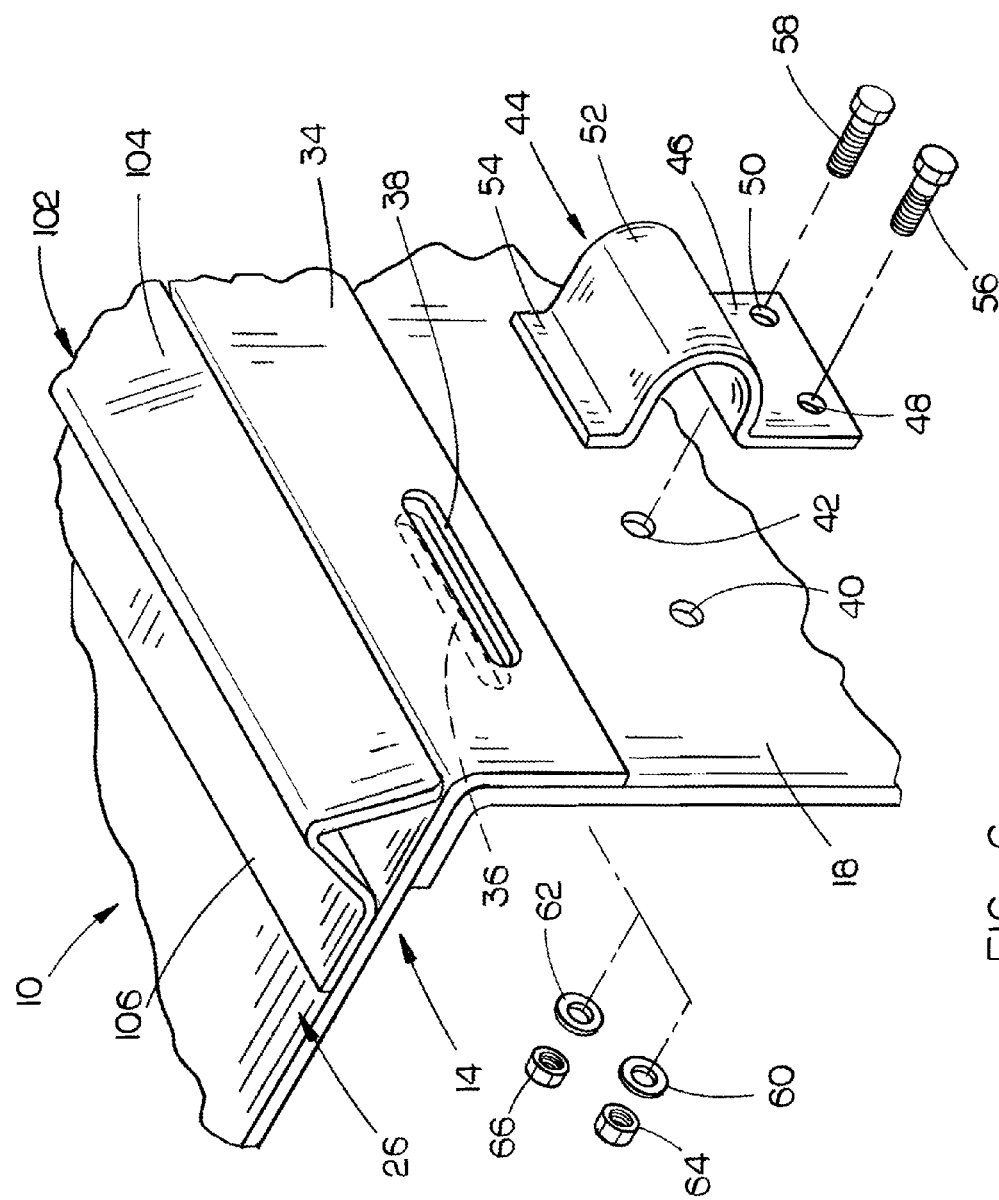
FIG. 6 is a partial exploded perspective view of the hinge mechanism for the cover of the cable tray of this invention.

As seen in FIG. 6, one end of cover 26 has a downwardly projecting lip or flange 34 at its hinge end. Side wall 18 has a horizontally disposed slot 36 formed therein. Lip 34 of cover 26 has a horizontally disposed slot 38 formed therein which registers with slot 36 formed therein which registers with slot 36 when the cover 26 is in the closed position of FIG. 6. Side wall 18 of body portion 14 has a pair of horizontally spaced bolt openings 40 and 42 formed therein below slot 36. The numeral 44 refers to a hinge clip having a lower base 46 having bolt openings 48 and 50 formed therein. Clip 44 also includes a U-shaped portion 52 above base 46 and an upper end portion 54 above portion 52.

Figure 7:
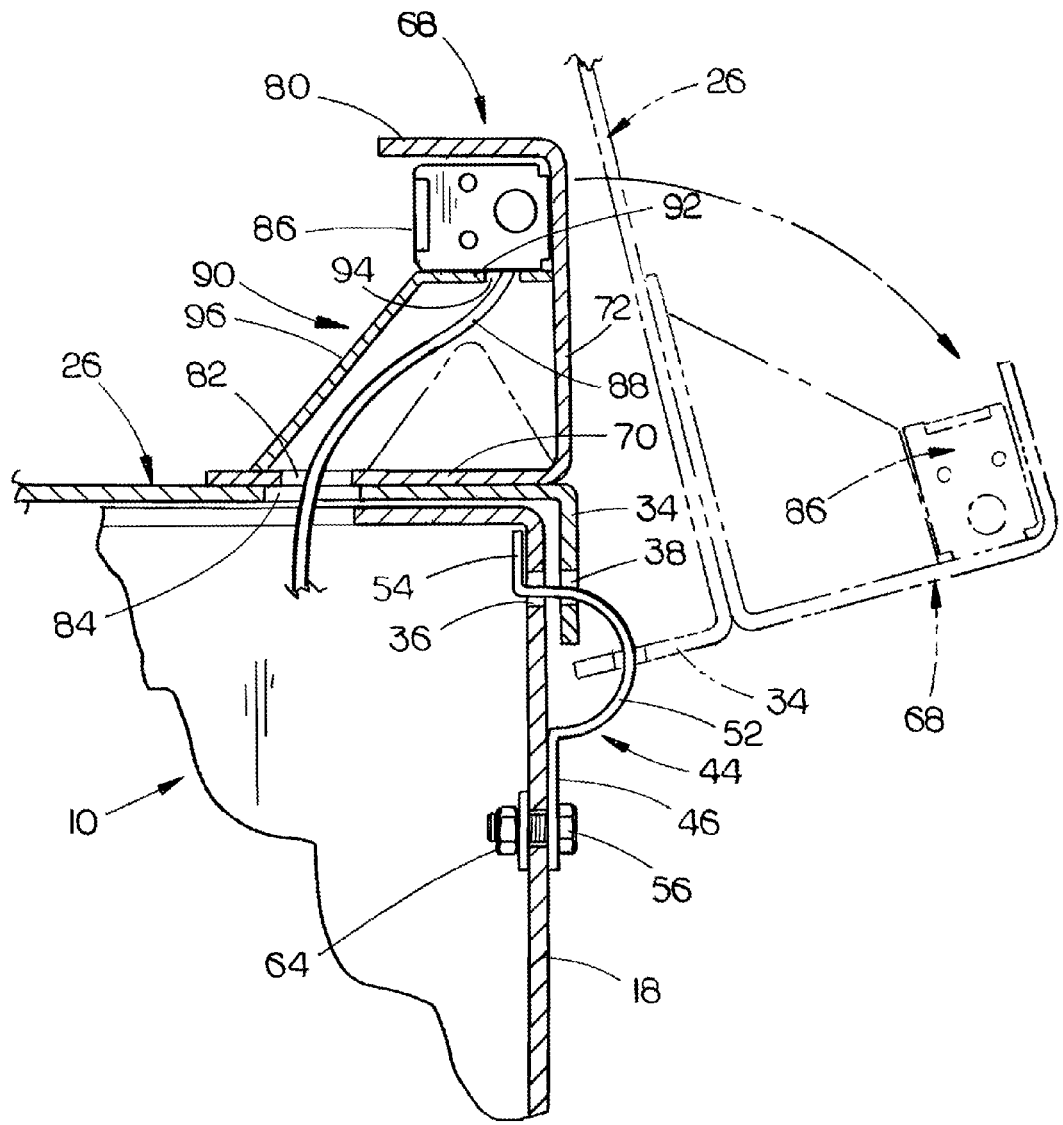
FIG. 7 is a partial sectional view of the hinge mechanism of FIG. 6.

The upper end portion 54 is extended through slots 38 and 36 as seen in FIG. 7 so that upper end portion 54 is at the inner surface of side wall 18 when hinge clip 44 is secured to side wall 18 by bolts 56 and 58 which extend through bolt openings 48 and 50 respectively and through bolt openings 40 and 42 respectively. The inner ends of bolts 56 and 58 have washers 60 and 62 received thereon respectively and nuts 64 and 66 threaded thereon respectively. The hinge clip 44 provides a "loose" hinge connection between the cover 26 and side 18 of body portion 14. The hinge clip 44 enables the cover 26 to be moved between open and closed positions. As seen in FIG. 7, as the cover 26 is moved from the solid line closed position to the broken line open position, the lip or flange 34 moves outwardly and downwardly on the U-shaped portion 52 of the hinge clip 44. Cover 28 opens and closes identical to cover 26.

Figure 3:
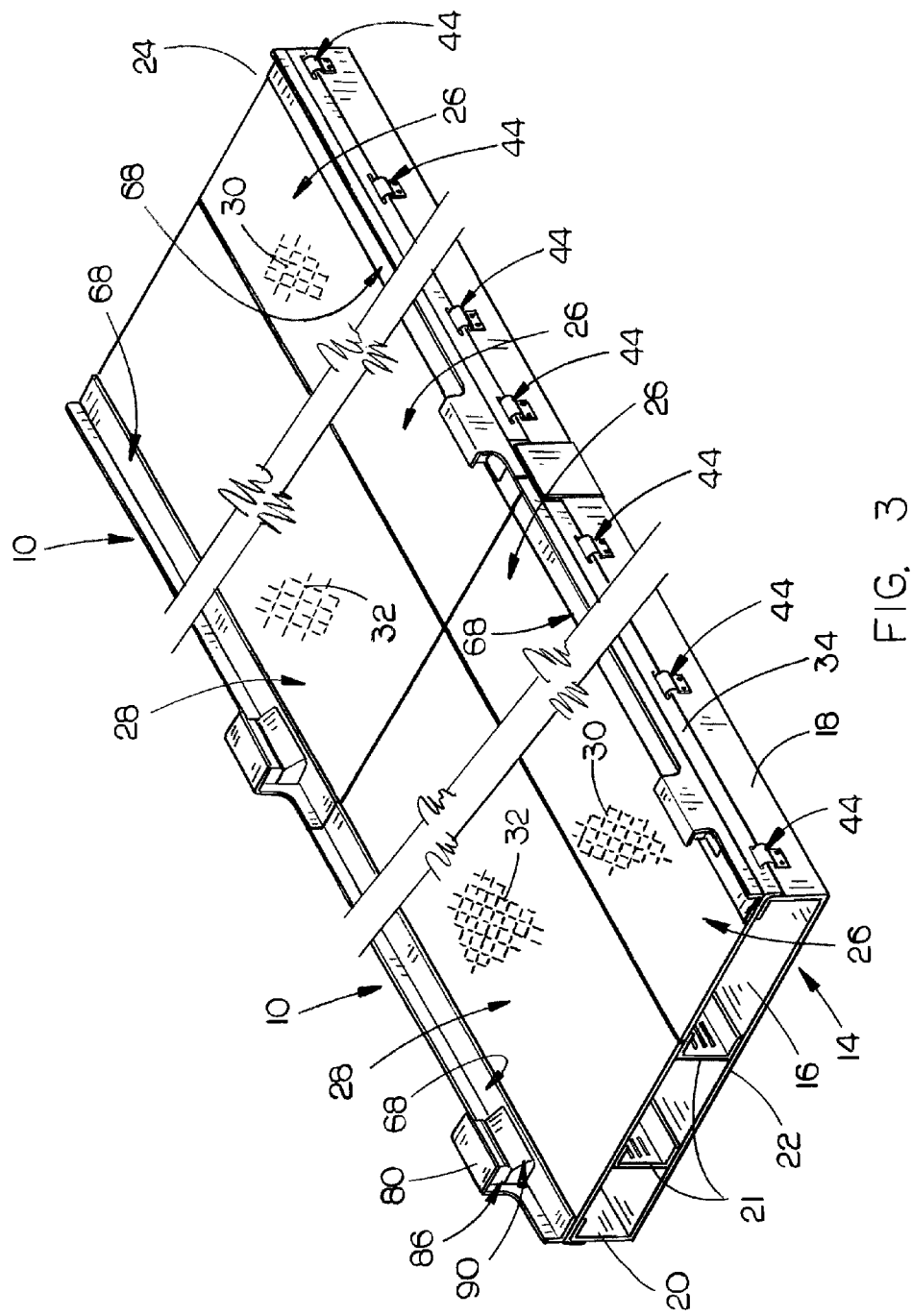
FIG. 3 is a partial perspective view of the walk-on cable tray of this invention.

A plurality of the hinge clips 44 hingedly secured the cover 26 to side wall 18. A plurality of the hinge clips 44 also hingedly secured the cover 28 to side wall 20, as seen in FIG. 3.

Figure 4:
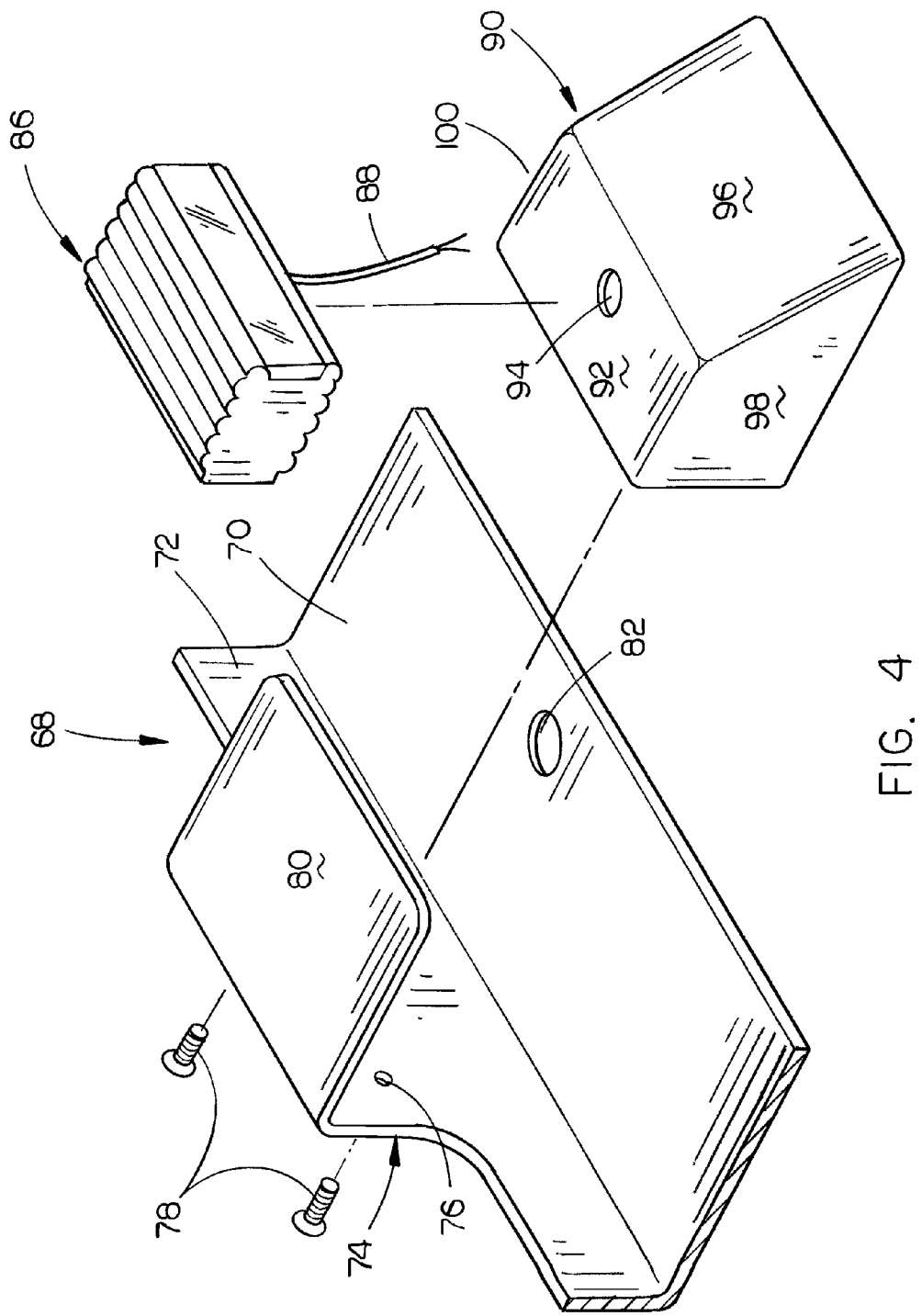
FIG. 4 is a partial exploded perspective view of one form of the tactile warning device at the sides of the cable tray of this invention which includes a light.

An elongated tactile warning device 68 is secured to the outer ends of cover 26 and extends upwardly therefrom to assist persons having impaired vision. Device 68 includes an elongated plate 70 which extends between the ends of the tray. Plate 70 is secured to the upper surface of cover 26 by any convenient means such as welding, screws, bolts, etc. Device 68 also includes an upstanding plate 72 which extends upwardly from the outer end of plate 70, as seen in FIG. 4. The device 68 preferably has at least one light support 74 which extends upwardly from plate 72. Light support 74 has a pair of screw openings 76 formed therein adapted to receive screws 78 therein. A flat light deflector plate or shield 80 extends horizontally from the upper end of light support 74, as seen in FIG. 4. As also seen in FIG. 4, plate 70 has an opening 82 formed therein which communicates with an opening 84 formed in cover 26. A light module 86 is positioned at the upper inner side of light support 74 and is secured thereto by the screws 78. Light module 86 has an electrical lead or cable 88 extending downwardly therefrom.

The numeral 90 refers to a housing which is designed to protect the electrical lead 88. Housing 90 includes a top wall 92 having an opening 94 formed therein, an inclined wall 96 and opposite side walls 98 and 100. The lower end of housing 90 is open as is the back thereof as seen in FIG. 7. Housing 90 is positioned adjacent the inner side of plate 72 below light module 86, as seen in FIG. 7. Housing 90 is secured to tactile warning device 68 by any convenient means such as bolts, studs, screws or welding. Electrical lead 88 extends downwardly through opening 82, in plate 70, through opening 84 in cover 26 and into the interior of cable tray 10 for electrical connection to a power source within cable tray 10.

An identical tactile warning device 68 is secured to the outer end of cover 28 to provide tactile warning devices at both sides of the cable tray 10 to aid visually impaired people to guide themselves should they have to walk along the covers of the cable trays should the people mover become disabled. The tactile warning devices may also be helpful to aid sighted people to guide themselves in emergency situations wherein there is limited visibility. The light modules 86, if used, will light the upper surfaces of the covers 26 and 28 to aid persons with sight to traverse the cable trays 10.

Figure 5:
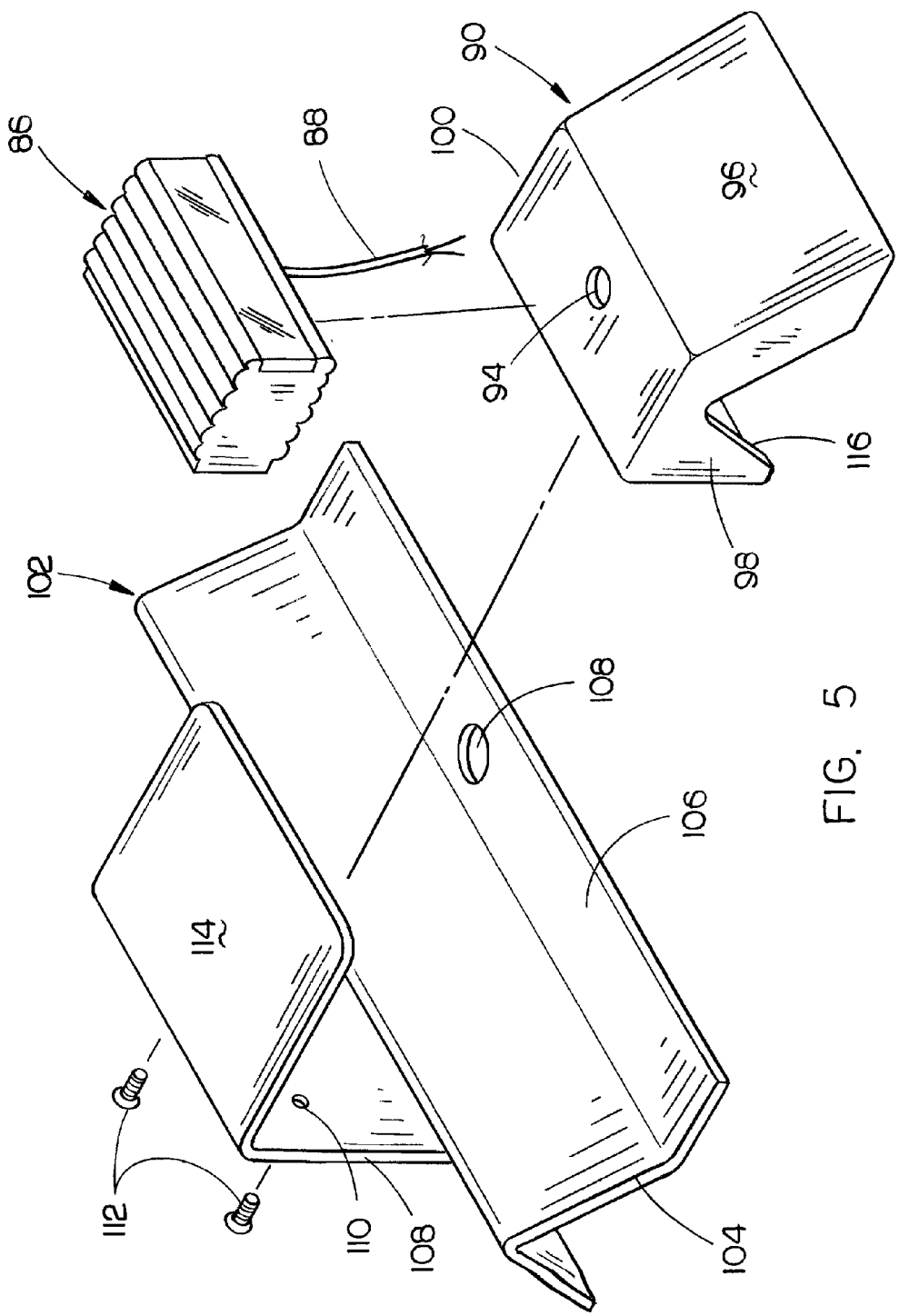
FIG. 5 is a partial exploded perspective view of a second embodiment of the tactile warning device at the sides of the cable tray of this invention which includes a light.

An alternate form of the tactile warning device, illustrated in FIGS. 5 and 6, is designated with the reference numeral 102. Device 102 includes an elongated angle member 104 which extends the length of the cable tray 10. A horizontally disposed plate 106 extends from the inner side of angle member 104 and has an opening 108 formed therein. Plate 106 and/or angle member 104 are secured to the outer side of the associated cover 26 or 28 by welding, screws, studs, bolts, etc. If lights are going to be used with the tactile warning device 102, a plate 108 will extend upwardly from device 102 and which will have a pair of bolt or screw openings 110 formed therein adapted to receive bolts 112 therein. A light deflector plate 114 extends inwardly from the upper end of plate 108 to serve the same purpose as deflector plate 80 of device 68. A light module 86 and housing 90 are also used with device 102. The only difference between the housing 90 of FIG. 5 and the housing 90 of FIG. 4 is that the side walls 98 and 100 of the housing 90 in FIG. 5 have inverted V-shaped openings 116 formed therein which receive the angle member 104 therein.

Thus it can be seen that the invention accomplishes at last all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. In combination:
    an electric train which travels along a power rail positioned on a roadway with the train including one or more cars having opposite sides;
    a plurality of generally rectangular electrical cable trays having first and second ends;
    said cable trays being connected together in an end-to-end relationship;
    said cable trays being positioned on the roadway at one side of the cars of the train;
    each of said cable trays including a body portion having a bottom wall with first and second ends and first and second upstanding side walls with upper ends;
    each of said cable trays including a cover, having a first end, a second end, a first side edge and a second side edge;
    said cover having an outer surface and an inner surface;
    said cover being selectively movable between a closed position and an open position;
    said cover, when in its said closed position extending between said upper ends of said first and second side walls;
    a first elongated and horizontally disposed tactile warning device, having first and second ends, extending upwardly from said outer surface of said first side edge of said cover;
    said first tactile warning device extending between said first and second ends of said cover whereby said first end of said first tactile warning device is positioned adjacent said first end of said cover and said second end of said first tactile warning device is positioned adjacent said second end of said cover;
    a second elongated and horizontally disposed tactile warning device, having first and second ends, extending upwardly from said outer surface of said second side edge of said cover;
    said second tactile warning device extending between said first and second ends of said cover whereby said first end of said second tactile warning device is positioned adjacent said first end of said cover and said second end of said second tactile warning device is positioned adjacent said second end of said cover;
    each of said first and second tactile warning devices comprises an elongated horizontally disposed first plate having a first end, a second end, an inner end and an outer end with said first plate being secured to said outer surface of said cover;
    each of said first and second tactile warning devices having an upstanding second plate, having upper and lower ends, which extends upwardly from said outer end of said first plate thereof;
    each of said first and second tactile warning devices having at least one upstanding third plate, having upper and lower ends, which extends upwardly from upper end of said second plate thereof;
    each of said first and second tactile warning devices having a fourth plate secured to said third plate thereof which extends inwardly therefrom; and
    a light positioned below said fourth plate for illuminating said cover.

2. The combination of claim 1 wherein said cover is hingedly secured to one of said first and second side walls of said body portion.

3. The combination of claim 1 wherein said cover includes first and second cover members.

4. In combination:
    an electric train which travels along a power rail positioned on a roadway with the train including one or more cars having opposite sides;
    a plurality of generally rectangular electrical cable trays having first and second ends;
    said cable trays being connected together in an end-to-end relationship;
    said cable trays being positioned on the roadway at one side of the cars of the train;
    each of said cable trays including a body portion having a bottom wall with first and second ends and first and second upstanding side walls with upper ends;
    each of said cable trays including a cover, having a first end, a second end, a first side edge and a second side edge;
    said cover having an outer surface and an inner surface;
    said cover being selectively movable between a closed position and an open position;
    said cover, when in its said closed position extending between said upper ends of said first and second side walls;
    a first elongated and horizontally disposed tactile warning device, having first and second ends, extending upwardly from said outer surface of said first side edge of said cover;
    said first tactile warning device extending between said first and second ends of said cover whereby said first end of said first tactile warning device is positioned adjacent said first end of said cover and said second end of said first tactile warning device is positioned adjacent said second end of said cover;

a second elongated and horizontally disposed tactile warning device, having first and second ends, extending upwardly from said outer surface of said second side edge of said cover;

said second tactile warning device extending between said first and second ends of said cover whereby said first end of said second tactile warning device is positioned adjacent said first end of said cover and said second end of said second tactile warning device is positioned adjacent said second end of said cover;

each of said first and second tactile warning devices comprises an elongated horizontally disposed first plate having a first end, a second end, an inner end and an outer end with said first plate being secured to said outer surface of said cover;

each of said first and second tactile warning devices having an elongated angle member, having inner and outer ends, positioned outwardly of said outer end of said first plate;

each of said first and second tactile warning devices having an upstanding second plate with upper and lower ends extending upwardly from said outer end of said angle member;

each of said first and second tactile warning devices having a third plate which extends inwardly from said upper end of said second plate; and a light positioned below said third plate for illuminating said cover.

* * * * *